(12) United States Patent
Sheridan et al.

(10) Patent No.: US 10,352,247 B2
(45) Date of Patent: Jul. 16, 2019

(54) LOW SPOOL STARTER SYSTEM FOR GAS TURBINE ENGINE

(71) Applicant: United Technologies Corporation, Hartford, CT (US)

(72) Inventors: William G. Sheridan, Southington, CT (US); Gabriel L. Suciu, Glastonbury, CT (US); Brian D. Merry, Andover, CT (US)

(73) Assignee: United Technologies Corporation, Farmington, CT (US)

( * ) Notice: Subject to any disclaimer, the term of this patent is extended or adjusted under 35 U.S.C. 154(b) by 605 days.

(21) Appl. No.: 14/767,477

(22) PCT Filed: Feb. 27, 2014

(86) PCT No.: PCT/US2014/018877
§ 371 (c)(1),
(2) Date: Aug. 12, 2015

(87) PCT Pub. No.: WO2014/134256
PCT Pub. Date: Sep. 4, 2014

(65) Prior Publication Data
US 2015/0377142 A1    Dec. 31, 2015

Related U.S. Application Data

(60) Provisional application No. 61/770,137, filed on Feb. 27, 2013.

(51) Int. Cl.
*F02C 7/275*    (2006.01)
*F02C 3/107*    (2006.01)
(Continued)

(52) U.S. Cl.
CPC .............. *F02C 7/275* (2013.01); *F01D 19/00* (2013.01); *F02C 3/107* (2013.01); *F02C 7/36* (2013.01);
(Continued)

(58) Field of Classification Search
CPC .. F02C 7/275; F02C 7/26; F02C 3/107; F02C 7/36; F02K 3/062; F16D 43/02;
(Continued)

(56) References Cited

U.S. PATENT DOCUMENTS 2,433,553 A * 12/1947 Heintze ................... F16D 45/00
192/45.017
2,926,765 A * 3/1960 Heid ....................... F16D 45/00
192/45.1

(Continued)

FOREIGN PATENT DOCUMENTS

| EP | 1980732 A2 | 10/2008 |
|---|---|---|
| GB | 213926 A | 1/1925 |
| WO | WO2011162845 A1 | 12/2011 |

OTHER PUBLICATIONS

International Searching Authority, PCT Notification of Transmittal of the International Search Report and the Written Opinion, dated Jun. 19, 2014, 13 pages.

(Continued)

*Primary Examiner* — Ted Kim
(74) *Attorney, Agent, or Firm* — Kinney & Lange, P.A.

(57) ABSTRACT

A gas turbine engine comprises a first compressor, a second compressor, a starter generator and a clutch. The starter generator is coupled to the first compressor. The clutch selectively couples the second compressor and the first compressor. The clutch is disposed between a first shaft and a second shaft to engage the first shaft with the second shaft at rest. A flyweight system is engaged with the clutch mechanism to permit freewheeling of the first shaft relative to the second shaft when subject to rotational motion beyond a threshold speed. A method for starting a gas turbine engine comprises engaging a low pressure compressor with a high pressure compressor utilizing a clutch, rotating the low pressure compressor and the high pressure compressor uti- (Continued)

lizing a starter generator coupled to the low pressure compressor, igniting the gas turbine engine, and disengaging the clutch at an operational speed of the gas turbine engine.

15 Claims, 6 Drawing Sheets

(51) Int. Cl.
*F01D 19/00* (2006.01)
*F02C 7/36* (2006.01)

(52) U.S. Cl.
CPC .... *F05D 2260/40* (2013.01); *F05D 2260/403* (2013.01); *F05D 2260/85* (2013.01)

(58) Field of Classification Search
CPC ........ F16D 43/04; F16D 43/06; F16D 41/067; F16D 41/08; F16D 41/086; F16D 2043/145; F04D 25/02; F05D 2260/4023
See application file for complete search history.

(56) References Cited

U.S. PATENT DOCUMENTS

| | | | |
|---|---|---|---|
| 3,187,869 A | 6/1965 | Spencer | |
| 3,229,795 A * | 1/1966 | Hill | F02C 7/275 |
| | | | 192/104 C |
| 4,368,651 A | 1/1983 | Bednar | |
| 4,531,620 A | 7/1985 | Stone | |
| 5,086,657 A * | 2/1992 | Wang | F02N 15/026 |
| | | | 192/103 B |
| 5,349,814 A | 9/1994 | Ciokajlo et al. | |
| 7,818,970 B2 | 10/2010 | Price et al. | |
| 8,015,828 B2 | 9/2011 | Moniz et al. | |
| 8,251,639 B2 | 8/2012 | Talan | |
| 8,314,505 B2 | 11/2012 | McLoughlin et al. | |
| 2002/0134642 A1 | 9/2002 | Genise | |
| 2007/0277532 A1 | 12/2007 | Talan | |
| 2008/0134660 A1 | 6/2008 | Finkenrath et al. | |
| 2010/0005810 A1 | 1/2010 | Jarrell et al. | |
| 2011/0094236 A1 | 4/2011 | Finkenrath et al. | |
| 2011/0154827 A1 | 6/2011 | Ress, Jr. et al. | |
| 2013/0000317 A1 | 1/2013 | Berryann et al. | |
| 2013/0098066 A1* | 4/2013 | Gallet | F02K 3/062 |
| | | | 60/796 |

OTHER PUBLICATIONS

Extended European Search Report for EP Application No. 14756398.5 dated Feb. 25, 2016, 7 pages.
Examination Report for EP Application No. 14756398.5, dated Sep. 4, 2018, 4 pages.

* cited by examiner

LOW SPOOL STARTER SYSTEM FOR GAS TURBINE ENGINE

BACKGROUND

The present disclosure relates generally to gas turbine engine architectures. More particularly, the present disclosure relates to systems for starting gas turbine engines.

Conventional dual spool gas turbine engines comprise a high pressure compressor and a high pressure turbine that define a core spool. The core spool generates a gas flow that drives a low pressure spool. The low pressure spool comprises a propulsor turbine, which powers a low pressure compressor and a fan. In such a configuration, operation of the engine is initiated by a starter that is coupled to the core spool through a tower shaft. The starter provides rotation to the core spool while fuel is injected into a combustor and ignited to initiate a combustion process that subsequently sustains rotation of the core spool and simultaneously the low pressure spool. Once the engine is rotating via the combustion process, the starter acts as a generator. The tower shaft requires coupling to a core spool shaft and the starter through elaborate gear systems. Furthermore, the tower shaft requires access to an axial length of the core spool shaft, which necessitates elongation of the core spool. There is, therefore, a need for a simpler starter-generator system that utilizes less space in the gas turbine engine.

SUMMARY

The present disclosure is directed to a gas turbine engine comprising a low pressure compressor, a high pressure compressor, a starter generator and a clutch. The starter generator is coupled to the low pressure compressor. The clutch selectively couples the high pressure compressor and the low pressure compressor.

The present disclosure is directed to a method for starting a gas turbine engine. The method comprises engaging a low pressure compressor with a high pressure compressor utilizing a clutch, rotating the low pressure compressor and the high pressure compressor utilizing a starter generator coupled to the low pressure compressor, igniting the gas turbine engine, and disengaging the clutch at an operational speed of the gas turbine engine.

The present disclosure is directed to a clutch mechanism, such as for use with a gas turbine engine compressor system. The clutch mechanism is disposed between a first compressor shaft and a second compressor shaft to engage the first compressor shaft with the second compressor shaft at rest. A flyweight system is engaged with the clutch mechanism to permit freewheeling of the first compressor shaft relative to the second compressor shaft when subject to rotational motion beyond a threshold speed.

DETAILED DESCRIPTION

Figure 1:
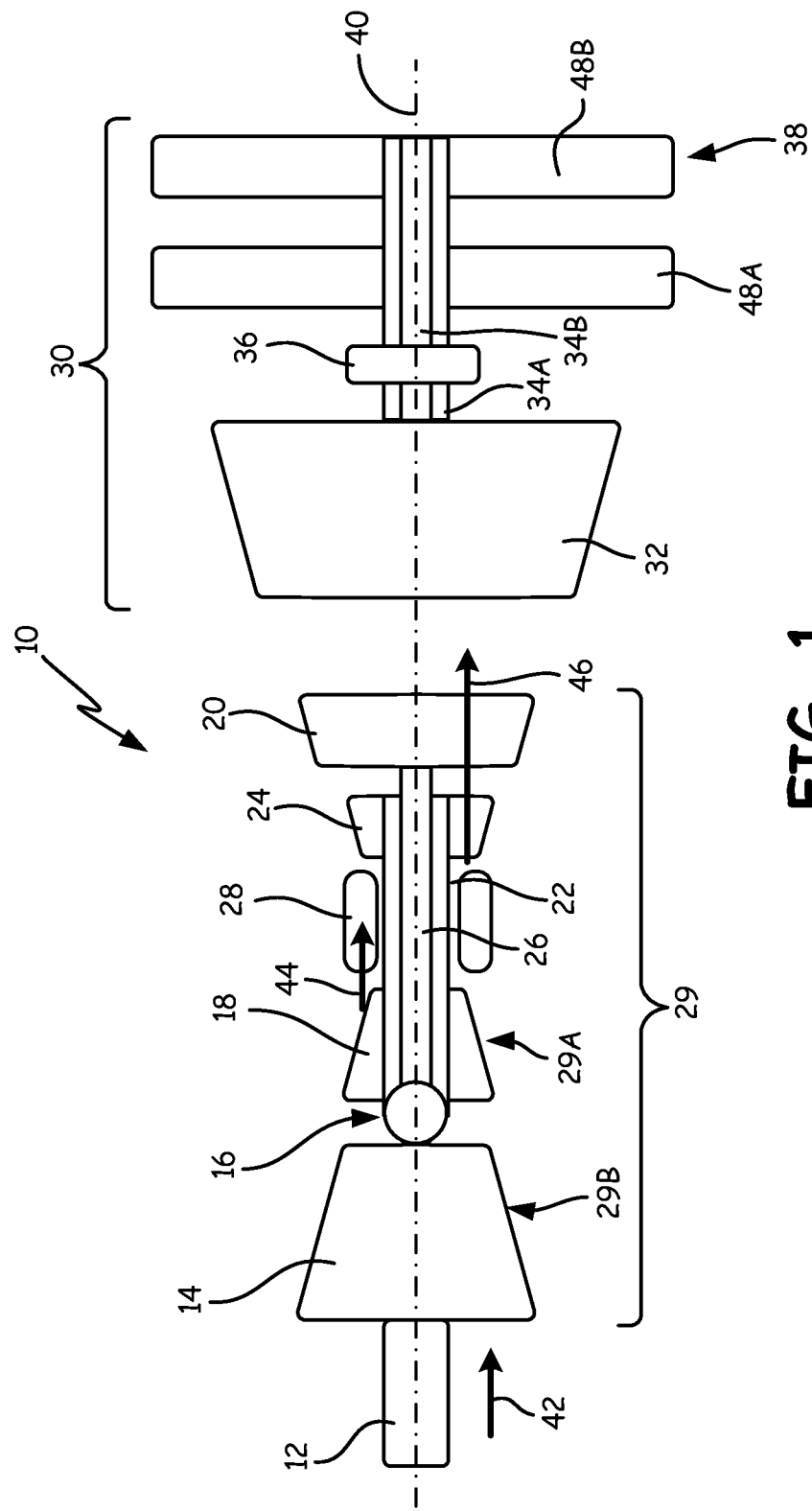
FIG. 1 is a schematic of a turboprop engine having a starter generator coupled to a low pressure compressor, and a clutch coupling the low pressure compressor to a high pressure compressor.

FIG. 1 is a schematic of gas turboprop engine 10 having starter generator 12 coupled to low pressure compressor 14, and clutch 16 coupling low pressure compressor 14 to high pressure compressor 18. Low pressure compressor 14 is coupled to low pressure turbine 20 through low pressure shaft 22. High pressure compressor 18 is coupled to high pressure turbine 24 through high pressure shaft 26. Combustor section 28 is disposed between high pressure compressor 18 and high pressure turbine 24. High pressure compressor 18, high pressure turbine 24 and high pressure shaft 26 define first spool 29A, and low pressure compressor 14, low pressure turbine 20 and low pressure shaft 22 define second spool 29B. First spool 29A and second spool 29B define gas generator module 29, which is a dual-spool core that provides high energy gases for driving propulsor module 30. Propulsor module 30 comprises power turbine 32, power shafts 34A and 34B, gear system 36 and propeller system 38. The turboprop engine, which is a type of gas turbine engine 10, is circumferentially disposed about a central, longitudinal axis or axial engine centerline 40. In addition, the illustrated turboprop has an aft mounted propulsor. FIG. 1 and the corresponding description thereof provide an overview of the various systems and operations of a gas turbine engine. The present application is additionally applicable to all types of gas turbine engines, including industrial gas turbines, turboshaft engines, turbofan engines, turboprop engines having a forward mounted propulsor, and the like.

Incoming ambient air 42 enters gas turbine engine 10 at low pressure compressor 14 and subsequently passes through high pressure compressor 18 to become pressurized air 44. Fuel mixes with pressurized air 44 in combustor section 28, where it is burned after being lighted with an igniter, as is known in the art. Combustion gases 46 expand through high pressure turbine 24 and low pressure turbine 20. Combustion gases 46 continue through gas turbine engine 10 to enter propulsor module 30. Combustion gases 46 rotate power turbine 32, which rotates power shaft 34A. Power shaft 34A drives gear system 36, which rotates power shaft 34B. Gear system 36 reduces the speed of power shaft 34B relative to power shaft 34A. In one embodiment, gear system 36 comprises an epicyclic gear system, such as a planetary gear system or a star gear system. Power shaft 34B provides input to propeller system 38. In the embodiment shown, propeller system 38 includes first stage propellers 48A and second stage propellers 48B. First stage propellers 48A and second stage propellers 48B generate thrust, which is used to push an aircraft to which gas turbine engine 10 is mounted.

In order to initiate the combustion process that sustains operation of gas turbine engine 10, an external force must be applied to gas generator module 29 to start rotation of the dual-spool core about centerline 40. Starter generator 12 is coupled to low pressure compressor 14, which is linked to high pressure compressor 18 via clutch 16. Starter generator 12 is coupled to a forward end of low pressure compressor 14 coaxially along engine centerline 40. Mounting of starter generator 12 in such a location provides direct axis to low pressure shaft 22, which eliminates the need for angled or beveled gear systems and tower shafts. Furthermore, the location of starter generator does not require access to an axial length of low pressure shaft 22, which enables the axial size of engine 10, gas generator module 29 in particular, to be shortened. Starter generator 12 comprises an electric motor, as is known in the art, that can be mechanically driven to generate electrical power. Starter generator 12 is connected to a source of electrical power (not shown) to provide mechanical input to gas generator module 29.

When electrical power is applied to starter generator 12, a starter shaft (not shown) is rotated that provides rotational input to low pressure compressor 14, which rotates low pressure shaft 22. Low pressure compressor 14 is mechanically coupled to high pressure compressor 18 through clutch 16 such that rotation of low pressure compressor 14 also rotates high pressure compressor 18. Clutch 16 is configured to be engaged at rest and up to a threshold rotational speed. With both first spool 29A and second spool 29B rotating under power from starter generator 12, fuel can be injected into combustor section 28 and ignited to begin a combustion process that will generate combustion gases 46, which sustain rotation of the first and second spools without power from starter generator 12. Once the combustion process becomes sustainable, such as when sufficient temperatures and pressures are reached gas generator module 29, electrical power to starter generator 12 can be terminated and clutch 16 can disengage to permit first spool 29A and second spool 29B to rotate independently of each other. Typically, the high pressure, first spool 29A rotates at higher speeds than the low pressure, second spool 29B. In one embodiment, clutch 16 disengages under centrifugal force generated by rotation of low pressure shaft 22.

Figure 2:
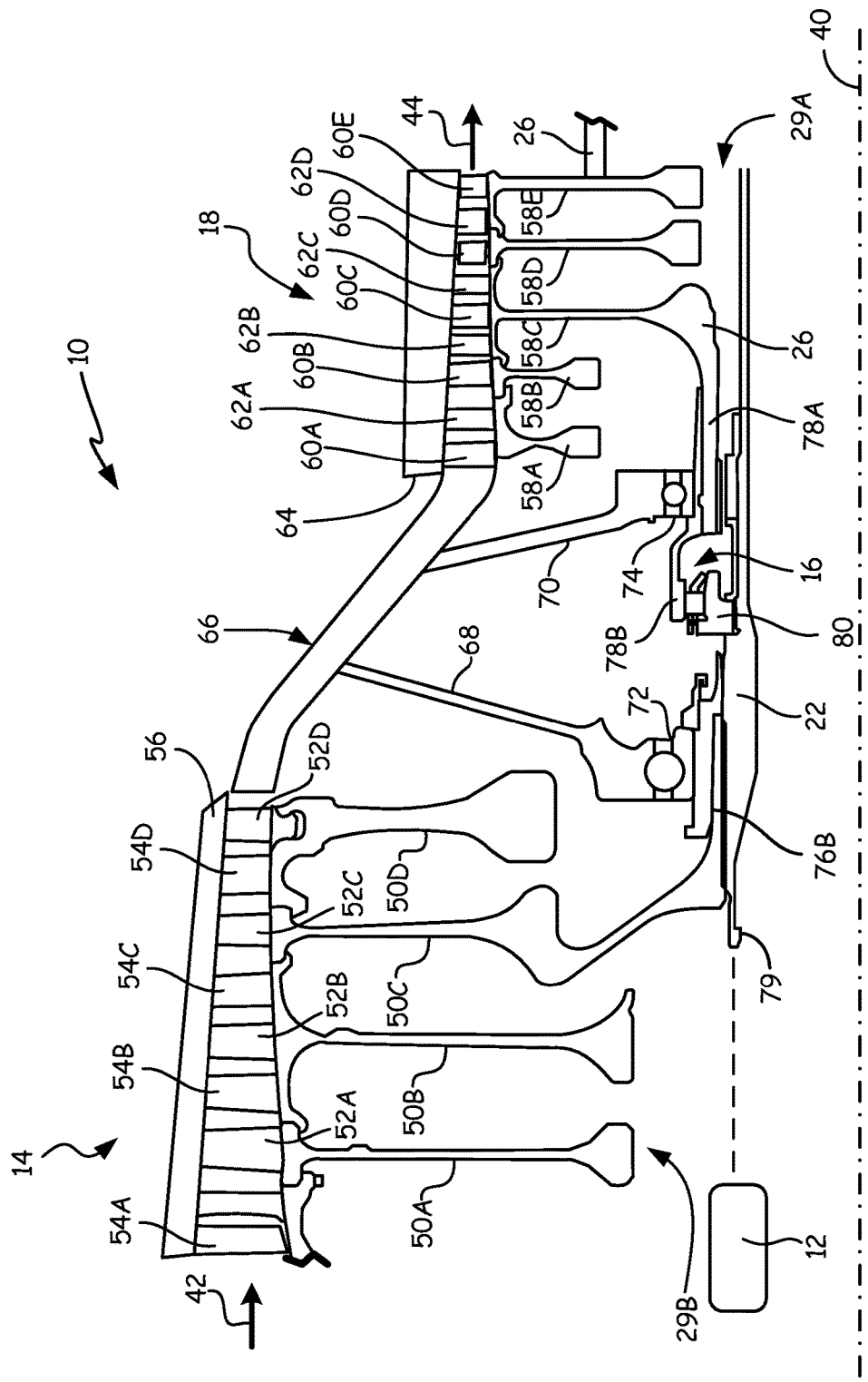
FIG. 2 is a schematic cross-sectional view of a low pressure compressor coupled to a high pressure compressor via a clutch.

FIG. 2 is a schematic cross-sectional view of low pressure compressor 14 coupled to high pressure compressor 18 via clutch 16. Low pressure compressor 14 comprises a plurality of interconnected rotors 50A-50D, each comprising a plurality of blades 52A-52D. A plurality of vanes 54A-54D extend radially inward from low pressure compressor case 56 to be interposed with blades 52A-52D. Similarly, high pressure compressor 18 includes rotors 58A-58E, blades 60A-60E, vanes 62A-62D and case 64. Transition duct 66 fluidly connects the exit of low pressure compressor 14 with the inlet of high pressure compressor 18. Second spool 29B further includes bearing 72, radial extension 76A and axial extension 76B. First spool 29A further includes bearing 74, axial extension 78A and stub shaft 78B.

Forward strut 68 extends from transition duct 66 to low pressure shaft 22, and aft strut 70 extends from transition duct 66 to axial extension 78A. First bearing 72 is disposed between forward strut 68 and low pressure shaft 22, and second bearing 74 is disposed between aft strut 70 and axial extension 78A. The forward end of low pressure shaft 22 is easily accessible within low pressure compressor 14 close to engine centerline 40 (FIG. 1). In one embodiment, low pressure shaft 22 includes flange 79, which may be used to couple to starter generator 12 either directly so as to be radially within rotors 50A-50D, or through a shaft extension so as to be axially forward of rotors 50A-50D, such as shown in FIG. 1.

Rotors 50A-50D are coupled to each other at their outer diameter rims so as to rotate in unison. Rotors 50A-50D include hub portions at their inner diameters to provide balance. In the embodiment shown, the hub of rotor 50C includes radial extension 76A and axial extension 76B, which couple to low pressure shaft 22, such as through a spline or some other conventional coupling. First bearing 72 is disposed atop, or radially outward of, axial extension 76B. Forward strut 68 extends from transition duct 66, which is stationarily mounted within gas turbine engine 10, to low pressure shaft 22 to support second spool 29B. Low pressure shaft 22 extends axially rearward from axial extension 76B, concentrically inside of first spool 29A, to low pressure turbine 20 (FIG. 1).

Rotors 58A-58E are coupled to each other at their outer diameter rims so as to rotate in unison. Rotors 58A-58E include hub portions at their inner diameters to provide balance. In the embodiment shown, the hub of rotor 58C includes axial extension 78A, which supports second bearing 74, and stub shaft 78B, which connects to clutch 16. Rotor 58E is connected to high pressure shaft 26, which extends through combustor section 28 to join to high pressure turbine 24 (FIG. 1). Second bearing 74 is disposed atop, or radially outward of, axial extension 78A. Aft strut 70 extends from transition duct 66, which is stationarily mounted within gas turbine engine 10, to axial extension 78A to support first spool 29A.

Clutch 16 connects stub shaft 78B of first spool 29A to low pressure shaft 22 of second spool 29B via clutch shaft 80. In the described embodiment, clutch 16 is mounted to low pressure shaft 22 so as to be continuously engaged with second spool 29B and continuously rotating with low pressure shaft 22. Clutch 16 is configured to engage with stub shaft 78 of first spool 29A at rest and up to a threshold rotational speed. The threshold rotational speed is a speed at which both first spool 29A and second spool 29B are rotating and at which gas turbine engine 10 is able to sustain operation based on the combustion process being carried out in combustor section 28 (FIG. 1). At and above the threshold rotational speed, clutch 16 is configured to disengage with stub shaft 78B to allow freewheeling of first spool 29A relative to second spool 29B. As mentioned, once engine 10 has reached idle speed, first spool 29A tends to rotate faster than second spool 29B.

In the described embodiment, clutch 16 comprises a ramp/roller (double cage) clutch. For example, clutch 16 may comprise an actively controlled ramp/roller clutch as is described in U.S. Pat. No. 4,531,620, which is assigned to United Technologies Corporation and is incorporated herein by reference. In another embodiment, clutch 16 is an automatically actuated ramp/roller clutch that releases at the threshold rotational speed. In other embodiments, clutch 16 may comprise any other suitable clutch, such as a Sprag clutch. In one particular embodiment, clutch 16 is configured as a ramp/roller clutch that releases based on actuation of a flyweight under centrifugal loading, as is described with reference to FIGS. 3-6.

Figure 3:
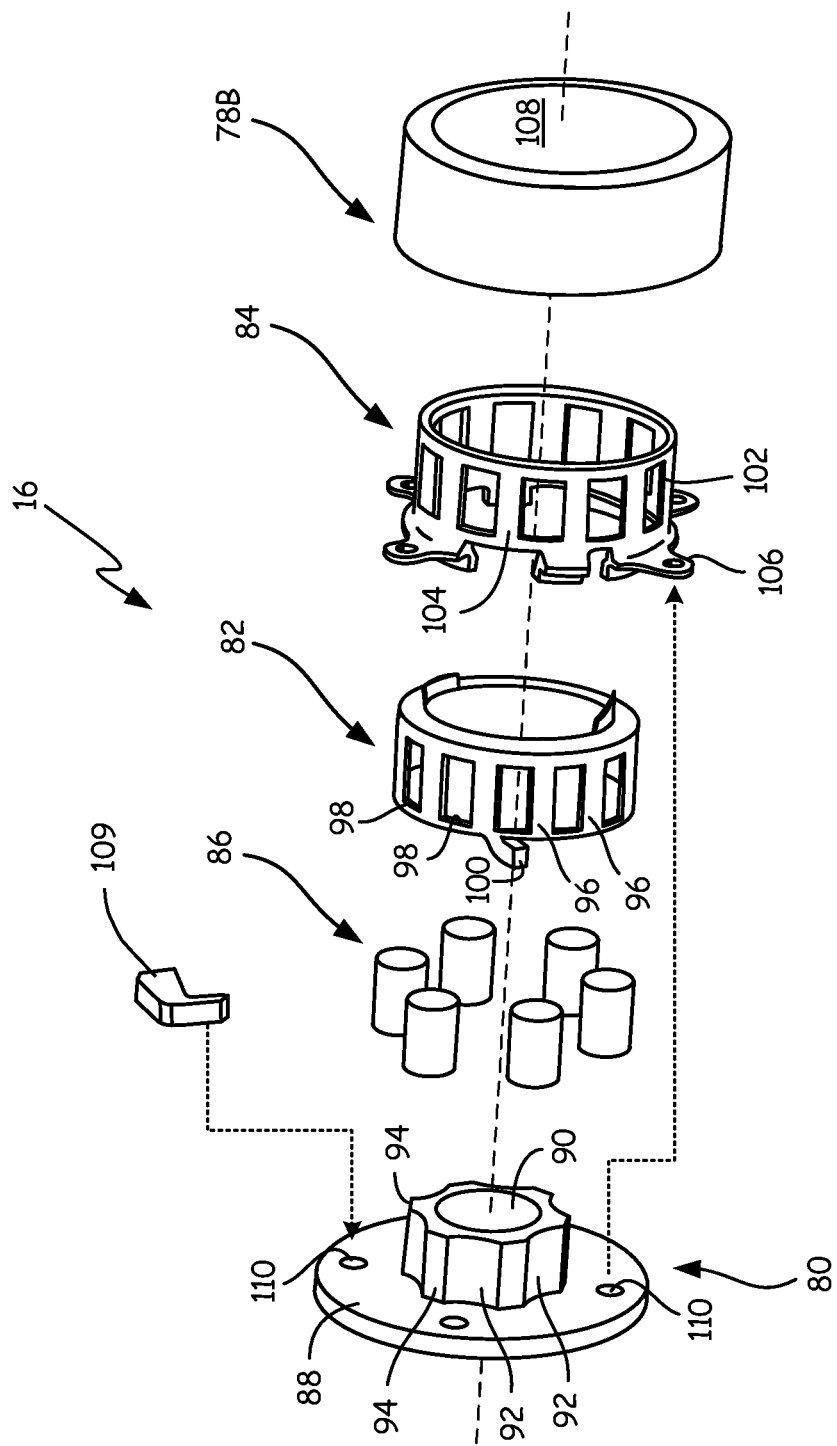
FIG. 3 is an exploded view of a ramp/roller clutch mechanism suitable for coupling the compressors of FIGS. 1 and 2.

FIG. 3 is an exploded view of clutch 16 comprising a ramp/roller clutch mechanism suitable for coupling compressors 14 and 18 of FIGS. 1 and 2. Clutch 16 includes actuation cage 82, stationary cage 84 and rollers 86, in addition to being linked to stub shaft 78B and clutch shaft 80. Clutch shaft 80 includes flange 88, bore 90, indentations 92 and ramps 94. Actuation cage 82 includes bars 96, windows 98 and lug 100. Stationary cage 84 includes slots 102, ramps 104 and mounting flanges 106. Stub shaft 78B includes inner surface 108. Clutch 16 also includes actuator arm 109.

Clutch shaft 80 is coupled to low pressure shaft 22, such as by a spline at bore 90. The outer diameter surface of clutch shaft 80 is configured as a sprocket-like body defined by indentations 92 and ramps 94. Each indentation 92 corresponds to one of rollers 86, each of which comprises a cylindrical body, but that may have other configurations. Rollers 86 are spaced peripherally about clutch shaft 80 by insertion into windows 98 of actuation cage 82. Actuation cage 82 is rotated within clutch 16, such as with lug 100, to move rollers 86 from indentations 92 to ramps 94, and vice versa, via interaction with bars 96.

Figure 4B:
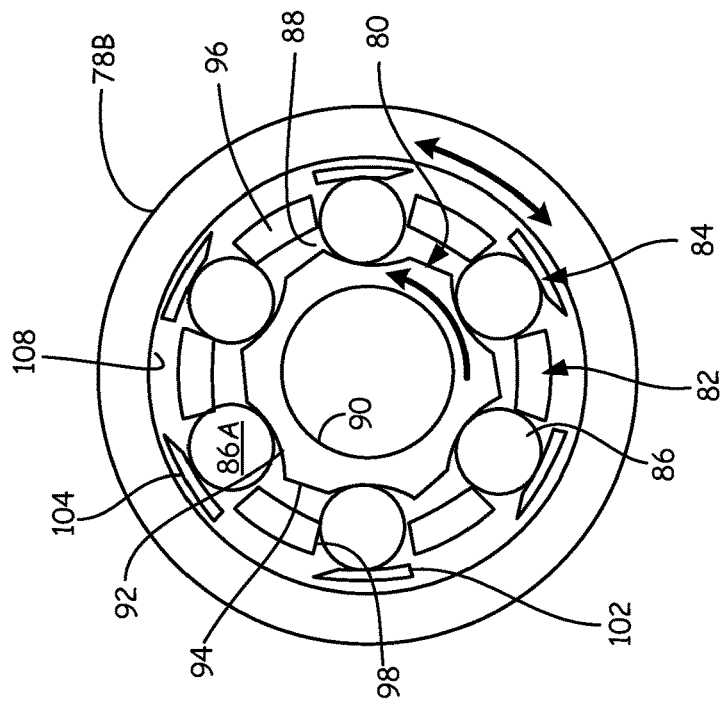
FIG. 4B is a cross-sectional view of an assembly of the clutch mechanism of FIG. 3 wherein rollers are radially contained between a stationary cage and pockets of the first shaft via displacement of the rotating cage.
Figure 4A:
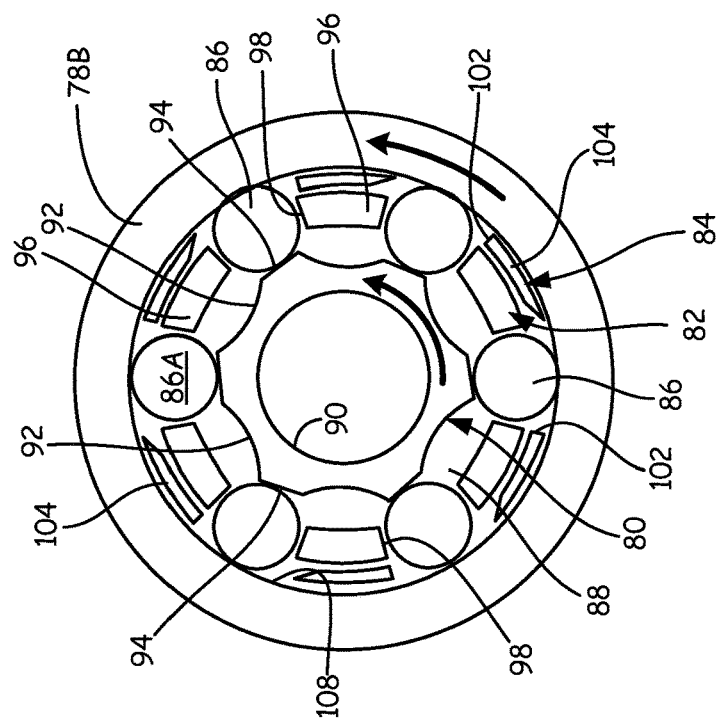
FIG. 4A is a cross-sectional view of an assembly of the clutch mechanism of FIG. 3 wherein rollers are radially locked between a ramps of a first shaft and a second shaft via positioning of a rotating cage.

As will be discussed with reference to FIG. 6, lug 100 is biased by a pin to move rollers 86 over ramps 94 to normally cause clutch 16 to be in an engaged state, as illustrated in FIG. 4A. As will be discussed with reference to FIG. 5, actuation cage 82 is pushed by actuator arm 109 to push rollers 86 under ramps 104. Positioning of rollers 86 under ramps 104 causes clutch 16 to be in a freewheeling state, as illustrated in FIG. 4B.

Stationary cage 84 is positioned concentrically around actuation cage 82 and clutch shaft 80, and coupled to flange 88 of clutch shaft 80 via fasteners (not shown) inserted through mounting flanges 106 and into bores 110. Stationary cage 84 is thus stationary with reference to clutch shaft 80 and low pressure shaft 22 (FIG. 3), but rotates within engine 10 about engine centerline 40 (FIG. 1). Depending on the position of actuation cage 82, rollers 86 are either disposed within slots 102 (FIG. 4A) in an engaged mode, or radially inward of ramps 104 (FIG. 4B) in a freewheeling mode. Stub shaft 78B is fitted over stationary cage 84 so that inner surface 108 surrounds ramps 104.

FIG. 4A is a cross-sectional view of an assembly of clutch 16 of FIG. 3 wherein rollers 86 are radially locked between stub shaft 78B and ramps 94 of clutch shaft 80 via positioning of actuation cage 82. With clutch shaft 80 being driven counterclockwise as illustrated in FIG. 4A, each roller 86 is wedged between a corresponding ramp 94 and bore 108 of stub shaft 78B. Thus, stub shaft 78B rotates counterclockwise with clutch shaft 80. As will be discussed with reference to FIG. 6, actuation cage 82 is pushed clockwise into the position shown in FIG. 4A via a spring-actuated pin.

Ramps 94 have surfaces that are angled with respect to a line tangent to clutch shaft 80 at each ramp to facilitate clutch shaft 80 rotating counterclockwise underneath rollers 86. Ramps 94 are additionally angled to prevent clutch shaft 80 from driving stub shaft 78B in the clockwise direction. The distance between a circumferential segment of ramps 94 and inner surface 108 less than the diameter of rollers 86. Thus, as bars 96 of actuation cage 82 push rollers 86 up ramps 94, rollers 86 are put into compression between surface 108 and ramps 94 to interlock stub shaft 78B and clutch shaft 80, which then rotate together as a unit.

With the above configuration, when starter generator 12 (FIG. 2) is actuated as a motor, clutch shaft 80 is rotated. Rotation of clutch shaft 80 simultaneously causes stub shaft 78B to rotate. Clutch shaft 80 and stub shaft 78B continue to rotate together until a threshold rotational speed is reached.

FIG. 4B is a cross-sectional view of an assembly of clutch 16 of FIG. 3 wherein rollers 86 are radially contained between stationary cage 84 and indentations 92 of clutch shaft 80 via displacement of actuation cage 82. If stub shaft 78B begins to rotate counterclockwise faster than clutch shaft 80, rollers 86 will begin to roll down ramps 94 into indentations 92.

To fully disengage clutch 16, actuation cage 82 is rotated counterclockwise with respect to clutch shaft 80 so that the rollers 86 are advanced into corresponding indentations 92. Rollers 86 are simultaneously rolled onto ramps 104 of stationary cage 84. The distance between indentations 92 and ramps 104 is greater than the diameter of rollers 86.

Stationary cage 84 is mounted directly to clutch shaft 80 via mounting flanges 106 (FIG. 3) and flange 88. Mounting of cage 84 directly on clutch shaft 80 enables stationary cage 84 to retain its original position with respect to clutch shaft 80. When actuation cage 82 is moved relatively counterclockwise with respect to clutch shaft 80 by actuation arm 109 (FIG. 3), mounting of cage 84 directly on clutch shaft 80 causes rollers 86 to become lodged between indentations 92 and ramps 104 of stationary cage 84. As such, rollers 86 are retained by ramps 104 within stationary cage 84 away from stub shaft 78B, which is free to rotate about stationary cage 84. Stub shaft 78B does not rub against stationary cage 84 or rollers 86, thereby preventing wear on clutch 16. The mechanism for activating actuation arm 109 and rotating actuation cage 82 counterclockwise for disengagement of clutch 16 is described with reference to FIG. 5.

Figure 5:
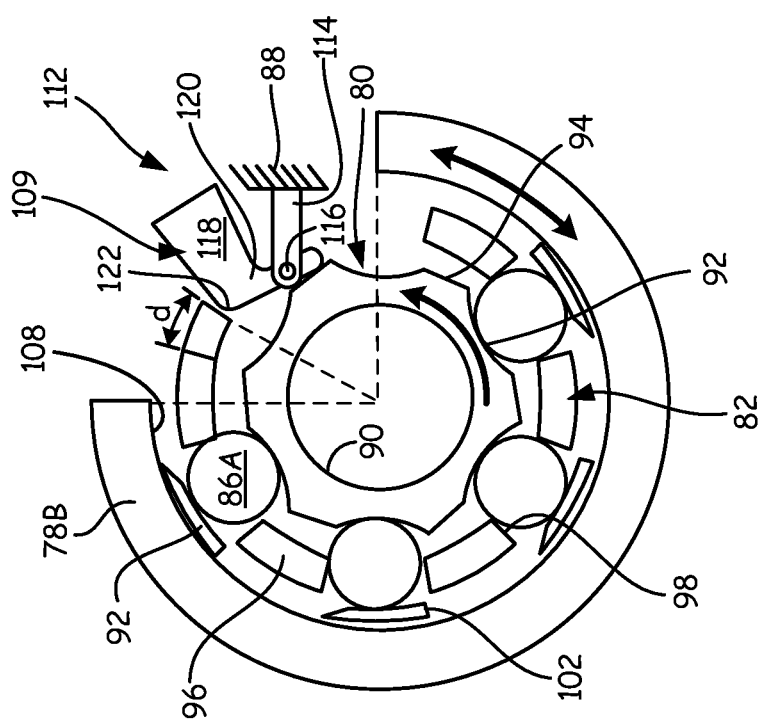
FIG. 5 is a cross-sectional view of an assembly of the clutch mechanism of FIG. 3 showing a flyweight actuation mechanism for the rotating cage.

FIG. 5 is a cross-sectional view of an assembly of clutch 16 of FIG. 3 showing flyweight actuation mechanism 112 for actuation cage 82. Flyweight actuation mechanism 112 includes actuation arm 109, which is schematically shown as being grounded to flange 88 (FIG. 3) of clutch shaft 80 at bracket 114. Actuation arm 109 can be mounted to flange 88 in different locations based on design considerations, such as the shape of actuation arm 109, the mass of actuation arm 109 and the use of any hardware, such as bracket 114.

In FIG. 5, actuation cage 82 is shown as being in the freewheeling position (FIG. 4B) from the engaged position (FIG. 4A) after being moved distance d by actuation arm 109, however actuation arm 109 is shown in the engaged or locked position. Actuation arm 109 rotates counterclockwise about pivot point 116 under centrifugal force to move actuation cage 82 to the freewheeling position.

In order to move actuation cage 82 from the engaged condition of FIG. 4A to the disengaged, or freewheeling condition of FIG. 4B, it is necessary to rotate actuation cage 82 counterclockwise with respect to clutch shaft 80. This is achieved by an axially longitudinal force acting on actuation cage 82 that is generated by actuation arm 109. Actuation arm 109 rotates on bracket 114 at pivot point 116 when clutch shaft 80 rotates at or above a threshold speed. In particular, flyweight 118 comprises a mass of material that is urged radially outward from pivot point 116 due to centrifugal forces. Flyweight 118 extends at approximately a right angle from extension 120 such that reaction surface 122 changes its circumferential distance from pivot point 116 as flyweight 118 moves radially outward. Reaction surface 122 can be configured to act against tangs located on actuation cage 82, similar to lug 100 (FIG. 3). As long as clutch shaft 80 rotates above the threshold rotational speed, actuation arm 109 will maintain actuation cage 82 in the disengaged position so that rollers 86 are maintained within ramps 104, thereby enabling stub shaft 78B to rotate faster or slower than clutch shaft 80.

Figure 6:
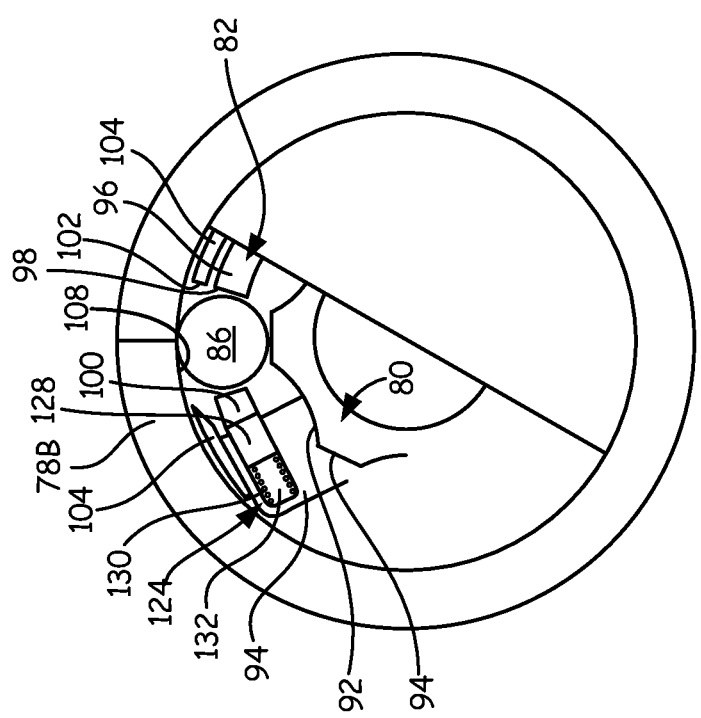
FIG. 6 is a cross-sectional view of an assembly of the clutch mechanism of FIG. 3 showing a spring-actuated locking mechanism for the rotating cage.

FIG. 6 is a cross-sectional view of an assembly of clutch 16 of FIG. 3 showing spring-actuated locking mechanism 124 for actuation cage 82. Locking mechanism 124 includes housing 126, pin 128 and spring 130. Housing 126 is coupled to, or disposed in, clutch shaft 80 in any suitable location so as to avoid interference with rotation of stub shaft 78B about clutch shaft 80. Thus, housing 126 rotates with clutch shaft 80. Housing 126 may be located as is described in the aforementioned U.S. Pat. No. 4,531,620 patent. Housing 126 is positioned opposite lug 100, which is mounted to actuation cage 82, as shown in FIG. 3.

Pin 128 is disposed in socket 132 in housing 126 and is biased out of socket 132 via spring 130. Force of spring 130 pushes pin 128 against lug 100, which causes actuation cage 82 to rotate clockwise with respect to clutch shaft 80. Spring 130 has a spring constant that is suitably stiff to maintain actuation cage 82 in a position to hold rollers 86 between ramps 94 and stub shaft 78B up to the threshold rotational speed, but that will yield when centrifugal force from actuation mechanism 112 (FIG. 5) acts on actuation cage 82 at the threshold rotational speed.

The present disclosure describes a system for starting a gas turbine engine through a low pressure compressor, which enables a starter generator to be mounted forward of the low pressure compressor near the engine centerline. The described starter system is particularly suitable for use with dual-spool cores where reduction in axial length of the gas generator is desirable, and coupling of tower shafts to existing core spool shafts is undesirable. Such a system reduces the complexity of coupling the starter generator to the core spools because the starter generator is more conveniently located near the desired output location, the low pressure spool shaft. The starter system includes a clutch that transmits torque from the low pressure compressor to the high pressure compressor to rotate the dual-spool core in unison to ignite the engine. The clutch automatically disengages without pilot or operator intervention to allow the different spools of the core to rotate at individually optimal speeds.

Discussion of Possible Embodiments

The following are non-exclusive descriptions of possible embodiments of the present invention.

A gas turbine engine comprising a first compressor; a second compressor; a starter generator coupled to the first compressor; and a clutch configured to selectively couple the first compressor and the second compressor.

The system of the preceding paragraph can optionally include, additionally and/or alternatively, any one or more of the following features, configurations and/or additional components:

a clutch shaft coupled to the first compressor and the clutch so as to rotate with the first compressor; and a stub shaft coupled to the second compressor and releasably engaged with the clutch so as to selectively rotate with the first compressor.

the first compressor comprises a low pressure compressor and the second compressor comprises a high pressure compressor.

a low pressure turbine coupled to the low pressure compressor; a high pressure turbine coupled to the high pressure compressor; and a propulsor module disposed aft of the low pressure turbine and the high pressure turbine.

a propulsor module comprising a power turbine coupled to a power shaft.

a propeller system coupled to a power shaft.

a gear system coupling a propeller system to a power shaft.

a clutch that is locked during low speed rotation; and that is automatically freewheeling during high speed rotation.

a clutch comprising a ramp/roller clutch that centrifugally disengages at a high speed.

a starter generator that is disposed coaxially upstream of the first pressure compressor.

A gas turbine engine comprises a low pressure spool comprising: a first compressor; a first turbine; and a first shaft connecting the first compressor and the first turbine; a high pressure spool nested between the first compressor and the first turbine, the high pressure spool comprising: a second compressor; a second turbine; and a second shaft coaxial with the first shaft and connecting the second compressor and the second turbine; and a clutch coupled to the first shaft and engagable with the second shaft.

The system of the preceding paragraph can optionally include, additionally and/or alternatively, any one or more of the following features, configurations and/or additional components:

a clutch comprising: a ramp/roller interface; a spring-actuated lock; and a flyweight-actuated release.

a starter generator coupled to the low pressure spool.

a starter generator that is disposed coaxially upstream of the low pressure compressor.

a power turbine configured to receive gas from the low pressure turbine and the high pressure turbine.

a turboprop driven by gas from the low pressure spool and the high pressure spool.

a low pressure spool and a high pressure spool that are configured as a two-spool core.

A method for starting a gas turbine engine comprises: engaging a low pressure compressor with a high pressure compressor utilizing a clutch; rotating the low pressure compressor and the high pressure compressor utilizing a starter generator coupled to the low pressure compressor; igniting the gas turbine engine; and disengaging the clutch at an operational speed of the gas turbine engine to allow the high pressure compressor to rotate independently of the low pressure compressor.

The method of the preceding paragraph can optionally include, additionally and/or alternatively, any one or more of the following features, configurations, steps and/or additional components:

powering a turboprop propulsor module with the gas turbine engine.

automatically disengaging the clutch.

a clutch that disengages centrifugally.

a clutch comprising: a ramp/roller interface; a spring-actuated lock mechanism; and a flyweight release mechanism; and a propulsor module comprising: a power turbine; a gear system connected to the power turbine; and a propeller system connected to the gear system.

A clutch comprises: a first shaft having circumferentially spaced outer recesses; a stationary cage affixed to the first shaft, the cage including a plurality of slots and ramps; rollers disposed within the slots in an engaged stated; an actuator cage rotatably positioned between the circumferentially spaced outer recesses and the stationary cage, the actuator cage having windows in which the rollers are disposed; and a lever arm coupled to the first shaft and configured to push the actuator cage to move the rollers from the slots to between the ramps and the circumferentially spaced outer recesses under centrifugal force in a disengaged state.

The system of the preceding paragraph can optionally include, additionally and/or alternatively, any one or more of the following features, configurations and/or additional components:

a lever arm including a flyweight.

a lever arm comprising a pivot point positioned between a first end and a second end, the pivot point being joined to the first shaft; and a flyweight extending from the second end at a right angle.

a the lever arm that is pinned between a flange extending from the first shaft and a flange extending from the stationary cage.

an outer surface further comprising: angled surfaces that define wedges disposed between the circumferentially spaced outer recesses.

a second shaft concentrically surrounding the first shaft, the actuator cage and the stationary cage.

a first shaft coupled to a first compressor and the clutch so as to always rotate with the first compressor; and a second shaft coupled to a second compressor and releasably engaged with the clutch so as to selectively rotate with the first compressor.

a biasing system to push the rollers between the angled surfaces and the second shaft when the clutch is at rest.

a biasing system comprising: a tab extending from the actuator cage; a pin connected to the first shaft; and a spring configured to push the pin against the tab.

a biasing system that is configured to push the rollers up wedges.

A clutch comprises: a first shaft having an outer surface defining intermittent wedges and troughs; a second shaft having an inner surface surrounding the wedges and troughs; a first cage coupled to the first shaft and defining ramps; rollers disposed circumferentially between adjacent ramps within the first cage such that the first shaft rotates with the second shaft; a second cage concentrically disposed between the wedges and troughs and the first cage; and a flyweight coupled to the first shaft and configured to circumferentially rotate the second cage when subject to centrifugal loading to move the rollers to being radially between the ramps and troughs such that the second shaft rotates independent of the first shaft.

The system of the preceding paragraph can optionally include, additionally and/or alternatively, any one or more of the following features, configurations and/or additional components:

a lever arm extending between a first end and a second end; a pivot point connecting the lever arm to the first shaft; and a flyweight extending from the second end of the lever arm at an oblique angle.

a flyweight that defines a reaction surface for smoothly engaging a lug on the second cage.

wedges that define angled surfaces.

a biasing system to push the rollers between the wedges and the second shaft when the clutch is at rest.

a biasing system comprising: a tab extending from the second cage; a pin connected to the first shaft; and a spring configured to push the pin against the tab.

A gas turbine engine compressor system comprises: a first compressor shaft; a second compressor shaft; a ramp/roller mechanism disposed between the first compressor shaft and the second compressor shaft to engage the first compressor shaft with the second compressor shaft at rest; and a flyweight system engaged with the ramp/roller mechanism to permit freewheeling of the first compressor shaft relative to the second compressor shaft when subject to rotational motion.

The system of the preceding paragraph can optionally include, additionally and/or alternatively, any one or more of the following features, configurations and/or additional components:

a flyweight system that releases the ramp/roller mechanism above a threshold rotational speed at which a gas turbine engine can sustain operation.

a flyweight system centrifugally engages the ramp/roller mechanism to disengage the second compressor shaft from the first compressor shaft.

a flyweight system comprising: a first flange extending from the first shaft; a second flange extending from a component of the ramp/roller mechanism connected to the first shaft; a lever arm pinned between the first and second flanges; a lug extending from a component of the ramp/roller mechanism rotatable between the first and second shafts; and a flyweight extending from the lever arm to engage the lug.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprising:
   a first compressor;
   a second compressor;
   a starter generator coupled to the first compressor; and
   a ramp/roller clutch that centrifugally disengages above a threshold rotational speed to selectively couple the first compressor and the second compressor, the ramp/roller clutch comprising:
      an actuation arm;
      a spring biasing the actuation arm to engage the ramp/roller clutch and to couple the first and second compressors below the threshold rotational speed; and
      a flyweight coupled to the actuation arm, wherein centrifugal loading imposed on the actuation arm and the flyweight by the first compressor rotating above the threshold rotational speed automatically disengages the clutch and decouples the first compressor and the second compressor.

2. The gas turbine engine of claim 1 wherein the ramp/roller clutch comprises:
   a clutch shaft coupled to the first compressor and the ramp/roller clutch so as to rotate with the first compressor; and
   a stub shaft coupled to the second compressor and releasably engaged with the ramp/roller clutch so as to selectively rotate with the first compressor.

3. The gas turbine engine of claim 1 wherein the first compressor comprises a low pressure compressor and the second compressor comprises a high pressure compressor.

4. The gas turbine engine of claim 1 and further comprising:
   a low pressure turbine coupled to the low pressure compressor;
   a high pressure turbine coupled to the high pressure compressor; and
   a propulsor module disposed aft of the low pressure turbine and the high pressure turbine.

5. The gas turbine engine of claim 4 wherein the propulsor module comprises:
   a power turbine coupled to a power shaft.

6. The gas turbine engine of claim 5 and further comprising:
a propeller system coupled to the power shaft.

7. The gas turbine engine of claim 6 and further comprising:
a gear system coupling the propeller system to the power shaft.

8. The gas turbine engine of claim 1 wherein the starter generator is disposed coaxially upstream of the first compressor.

9. A gas turbine engine comprising:
a low pressure spool comprising:
a first compressor;
a first turbine; and
a first shaft connecting the first compressor and the first turbine;
a high pressure spool nested between the first compressor and the first turbine, the high pressure spool comprising:
a second compressor;
a second turbine; and
a second shaft coaxial with the first shaft and connecting the second compressor and the second turbine; and
a clutch coupled to the first shaft and engagable with the second shaft, the clutch comprising:
a ramp/roller interface;
an actuation arm;
a spring-actuated lock comprising a spring biasing the actuation arm to engage the clutch and to couple the first and second shafts below a threshold rotational speed; and
a flyweight-actuated release comprising a flyweight coupled to the actuation arm, wherein centrifugal loading imposed on the actuation arm and the flyweight by the first compressor rotating above the threshold rotational speed automatically disengages the clutch and decouples the first and second shafts.

10. The gas turbine engine of claim 9 and further comprising:
a starter generator coupled to the low pressure spool.

11. The gas turbine engine of claim 10 wherein the starter generator is disposed coaxially upstream of the first compressor.

12. The gas turbine engine of claim 9 and further comprising:
a power turbine configured to receive gas from the first turbine and the second turbine.

13. The gas turbine engine of claim 9 and further comprising a turboprop driven by gas from the low pressure spool and the high pressure spool.

14. The gas turbine engine of claim 9 wherein the low pressure spool and the high pressure spool are configured as a two-spool core.

15. A method for starting a gas turbine engine, the method comprising:
engaging a low pressure compressor with a high pressure compressor utilizing a clutch, wherein the clutch comprises:
a ramp/roller interface;
an actuation cage;
an actuation arm coupled to the actuation cage;
a lock mechanism comprising a spring biasing the actuation arm and the actuation cage into an engaged position of the clutch; and
a flyweight actuation mechanism;
rotating the low pressure compressor and the high pressure compressor utilizing a starter generator coupled to the low pressure compressor;
igniting the gas turbine engine;
rotating the high pressure compressor above a threshold rotational speed to disengage the clutch using the flyweight actuation mechanism to allow the high pressure compressor to rotate independently of the low pressure compressor, wherein the flyweight actuation mechanism comprises a flyweight coupled to the actuation arm, and wherein above the threshold rotational speed, centrifugal forces acting on the flyweight and the actuation arm cause the actuation arm to compress the spring and to urge the actuation cage into a disengaged position of the clutch to automatically disengage the clutch; and
powering a turboprop propulsor module with the gas turbine engine, wherein the turboprop propulsor module comprises:
a power turbine;
a gear system connected to the power turbine; and
a propeller system connected to the gear system.

* * * * *